United States Patent [19]
Karsten et al.

[11] Patent Number: 5,817,395
[45] Date of Patent: Oct. 6, 1998

[54] A GRAINY THERMOPLASTIC FILM AND PROCESS FOR ITS MANUFACTURE

[75] Inventors: Petrus Karsten, NV Enkhuizen; José Branchadell, Wezembeek-oppem; Simon Van Zanten, LV Enkhuizen, all of Netherlands

[73] Assignee: Solvay (Société Anonyme), Brussels, Belgium

[21] Appl. No.: 642,314

[22] Filed: May 3, 1996

[30] Foreign Application Priority Data

May 15, 1995 [BE] Belgium ............................. 09500436

[51] Int. Cl.$^6$ .............................. B29C 59/04; B32B 3/28
[52] U.S. Cl. ..................... 428/141; 428/156; 428/522; 428/523; 383/106; 264/284; 264/210.5; 264/209.3
[58] Field of Search ................................. 428/141, 156, 428/522, 523; 383/106; 264/284, 210.5, 209.3

[56] References Cited

U.S. PATENT DOCUMENTS

| 4,021,179 | 5/1977 | Pira et al. ............................... 425/369 |
| 4,259,285 | 3/1981 | Baumgartl et al. ..................... 264/284 |
| 4,675,019 | 6/1987 | Belhouse et al. ........................ 604/408 |
| 4,810,451 | 3/1989 | Ermert et al. ......................... 264/209.1 |
| 4,997,616 | 3/1991 | Dehennau et al. ...................... 264/519 |
| 5,542,836 | 8/1996 | Gross et al. ............................ 425/141 |

FOREIGN PATENT DOCUMENTS

| 0008382 | 3/1980 | European Pat. Off. . |
| 0253260 | 1/1988 | European Pat. Off. . |
| 1466513 | 12/1966 | France . |
| 2358255 | 2/1978 | France . |
| 1207610 | 12/1965 | Germany . |
| 1629352 | 10/1970 | Germany . |
| 4220839 | 9/1993 | Germany . |
| 517577 | 2/1972 | Switzerland . |

OTHER PUBLICATIONS

Patent Abstract of Japan, vol. 12 no. 485, Dec. 19, 1988 & JP-A-63 205214 (Hayashi Terenpu KK), Aug. 24, 1988.
Database WPI Section Ch, Week 9040 Derwent Publications Ltd, London, GB; Class A96, AN 90–300689 & JP-A-02211160 (Sekisui Chem Ind KK), Aug. 22, 1990.

*Primary Examiner*—William P. Watkins, III
*Attorney, Agent, or Firm*—Spencer & Frank

[57] ABSTRACT

The invention relates to a process for the manufacture of a thermoplastic film which is grainy on its two faces, by passing thermoplastic material between two rolls essentially consisting of metal of high hardness. The invention also relates to a thermoplastic film obtained by this process, to the use of this film for the manufacture of an article for medical use and to this article itself. The thermoplastic material may be, for example, a vinyl chloride polymer or a polyolefin.

17 Claims, No Drawings

A GRAINY THERMOPLASTIC FILM AND PROCESS FOR ITS MANUFACTURE

FIELD OF THE INVENTION

The present invention relates to a process for the manufacture of a thermoplastic film which is grainy on its two faces, to a thermoplastic film according to this process, to the use of such a film for the manufacture of an article and to an article thus produced.

TECHNOLOGY REVIEW

Articles made of thermoplastic material have been employed for a long time in very numerous and various applications. In general, in the case of each of these applications it is desirable that the thermoplastic material employed should have a determined surface quality which makes it particularly suitable for the use which is envisaged. For example, in the field of medical accessories, and more particularly of blood or solution pouches which require sterilization, it is well known that during sterilization (several minutes at 121° C.) smooth wall surfaces produce both internal adhesive bonding of the pouch to itself and adhesive bonding between neighbouring pouches, and this is quite undesirable.

The solutions proposed in particular to overcome this problem include graining of the sheets constituting the pouch.

Continuous graining of a thermoplastic sheet or film is a technique which is well known and which consists in passing the hot thermoplastic sheet or film between a roll called a graining roll and a counter-pressure roll or backing roll. The graining roll is in most cases made of metal and has a surface whose relief, or grain, is the negative of the relief which is desired for the sheet or film. The backing roll itself is made of a resilient material, usually rubber, and in most cases must be cooled. The backing roll usually exerts on the graining roll a linear pressure which is lower than 100 kN/m, more commonly of the order of 5 to 50 kN/m.

Graining of the two faces of the thermoplastic film cannot be satisfactorily carried out according to this technique because a possible additional graining stage, with a graining cylinder in contact with the second face, would result in damage, or even complete obliteration, of the graining of the first face.

A draft solution to this problem was proposed in Patent FR 2 358 255 B1, filed in the name of Solvay & Co. Graining is performed on the two faces of a flat product by virtue of a device with three rolls: a first graining roll, a rubber backing roll and a second graining roll, made of metal, applied to the first graining roll with a linear pressure of the same order of magnitude as that of the backing roll.

Another solution consists in employing a backing roll made of elastomeric and grainy material. This process nevertheless does not allow very uniform graining of the two faces of the product.

Furthermore, these tentative solutions always recommend the use of a backing roll made of resilient material, and this has other disadvantages.

A first disadvantage is represented by the risk of contamination of the product by particles of this resilient material, which is highly undesirable, particularly for medical applications, where any contamination must be ruled out.

A second disadvantage consists of the fact that it is impossible to work with a rubber backing roll which has a sufficient temperature to provide a grain that is stable with time, above all at the sterilization temperature (121° C.).

A third disadvantage lies in the fact that a roll made of elastomeric material does not allow any graining of some thermoplastic materials such as polyolefins, in the case of which there are problems of adhesive bonding to the roll, and thermoplastic materials of high average molecular mass, that is also to say those which have a significant elasticity, in the case of which there are problems of thickness uniformity and of grain uniformity.

A fourth disadvantage is that, because of its elasticity, such a backing roll does not allow the final thickness of the flat product to be varied to a wide extent by adjusting its distance using the graining roll.

A fifth disadvantage is the lack of uniformity and of stability as a function of time of the graining produced with such a roll.

Finally, an additional disadvantage of a backing roll made of elastomeric material is that this material has a low thermal conductivity, and this prevents effective and uniform constant-temperature control of the roll, a factor which is necessary for obtaining a product of reproducible quality.

A third draft solution is presented in Patent Application EP 0 253 260 A1, in which a polyurethane sheet is grained on its two faces by a process involving two pairs of metal rolls. A first face of the sheet is grained by passing between a first graining roll and a first steel backing roll. The ungrained face of the sheet is subsequently grained, during a second stage, by passing the sheet between a second graining roll and a second steel backing roll.

This process therefore calls for four metal rolls in all and has the additional disadvantage that the graining of the first face is necessarily impaired during graining of the second face, all the more so since the second graining is carried out at higher temperature than the first.

SUMMARY OF THE INVENTION

The present invention therefore has as its subject a process for the manufacture of a thermoplastic film which is grainy on its two faces, which does not exhibit the many disadvantages due to the use of a roll made of elastomeric material, which employs one pair of metal rolls and which simultaneously carries out graining of the two faces of the film or of the sheet, graining that stands up to sterilization.

Consequently, the invention relates to a process for the manufacture of a thermoplastic film which is grainy on its two faces, by passing thermoplastic material between two graining rolls, which is characterized in that the two graining rolls essentially consist of metal of high hardness.

A thermoplastic film is intended to denote any flat product, including, for example, a sheet or a tape, which includes at least one thermoplastic material. The thermoplastic film preferably consists essentially of at least one thermoplastic material. A thermoplastic material denotes any thermoplastic polymer, including thermoplastic elastomers and mixtures thereof. The term "polymer" denotes both homopolymers and copolymers (especially binary or ternary ones), for example copolymers with random distribution, sequential copolymers, block copolymers, graft copolymers and the like.

In particular, the thermoplastic film may include a vinyl chloride polymer or a polyolefin. Excellent results have been obtained with a vinyl chloride polymer.

A vinyl chloride polymer is intended to denote any vinyl chloride homopolymer, any vinyl chloride copolymer and the mixtures of these homo- and/or copolymers.

"Polyolefin" denotes any olefin homopolymer, any polymer containing at least two different olefins and any polymer including at least 50% by weight of units derived from olefins, as well as mixtures of these homo- and/or copolymers with each other or with less than 50% by weight of nonolefinic polymers.

One or a number of conventional additives, polymeric or otherwise, such as inorganic or organic fillers, reinforcing materials (for example fibres), stabilizers, lubricants and the like may be added to the thermoplastic material(s).

A grainy film is a film in which at least one of the two faces, which is initially hot, has undergone a modification of its relief by moulding on a complementary relief surface. In the case of a continuous process the complementary relief surface generally consists of the engraved or sand-blasted surface of a roller of roll. In particular, a grainy film has a roughness such that Ra is at least equal to 0.1 $\mu$m (according to DIN standard 4768—May 1990). Ra is preferably at least equal to 0.5 $\mu$m.

The grain of the film may be uniform or nonuniform in structure. A grain of uniform structure is a grain which produces a regularly varying surface profile (for the definition of these terms, see ISO standard 4287/1—15 Dec. 1984). A grain of nonuniform structure produces a random surface profile.

By "metal" we mean a metal in the proper sense or a metal alloy with their usual additives.

A metal of high hardness is a metal that is highly resistant to surface deformation. In particular, its hardness according to the Vickers test (ASTM standard E 92—82 (reapproved 1987)) is not lower than 150 HV. The hardness of the metal is preferably not lower than 200 HV. More preferably, it is not lower than 350 HV.

It should be noted that the rolls may comprise various accessories of other kinds, like internal connections or channelling, or may have undergone a surface treatment further improving their properties, like, for example, chrome-plating or nitriding.

Various metals of high hardness can be adopted. Very good results have been obtained with rolls made essentially of steel or of cast iron.

The two rolls may be driven in rotation by common or independent mechanisms. Each of the rolls is advantageously driven in rotation by an independent mechanism. This means that the speed of rotation of one of the rolls can be adjusted without affecting the speed of rotation of the other roll. Any method of driving may be suitable. For example, each roll may be driven by means of a controlled-speed motor.

The Applicant Company has also found that it is advantageous for at least one of the rolls to be kept at a desired temperature by internal circulation of a heat transfer fluid.

The internal circulation of the heat transfer fluid may be produced by any known method. Highly satisfactory results have been obtained with a roll fitted with peripheral channels in which water circulates at the desired temperature.

Both rolls are preferably conditioned with regard to temperature, with conditioning temperatures which may be different for each roll. Still more preferably, both rolls are conditioned at a temperature of at least 121° C.

In a possible embodiment of the process according to the invention the passage of the thermoplastic material between the rolls is accompanied by the formation of a stock, that is to say of an extra thickness of the thermoplastic material accumulated in the upstream part of the gap between the two rolls. This stock, which is conventional in calendering, appears in certain operating conditions. It results from a recirculation of the thermoplastic material in the gap, and its amplitude depends in particular on the throughput, the relative speeds and the relative distance separating the two rolls, and on the rheological parameters of the thermoplastic material.

The rolls are designed so that their mutual separation can be adapted to the desired thickness for the thermoplastic film.

The formation of a stock is accompanied by a high pressure exerted between the two rolls. The rolls must typically withstand linear pressures of the order of several hundred kN/m, more particularly between 400 and 1000 kN/m.

The device for feeding thermoplastic material into the gap between the rolls may be of any kind. According to a preferred method the material originates directly from an extruder or a gelling machine. This material may be introduced equally well in the form of a flat product or in the form of a rod. In the latter case the thermoplastic film is formed in situ between the graining rolls. In the case where the thermoplastic material is introduced into the gap already in the form of a flat product, the latter may have a width that is either smaller or greater than the width desired for the final product.

The final desired width for the film is reached by adapting certain parameters of the process like, for example, the speeds of the rolls in relation to the speed of the thermoplastic material leaving the feed device or the distance between the latter and the rolls. The final thickness of the thermoplastic film, for its part, is determined by the distance separating the two graining rolls.

The applicants has found that the process according to the invention not only makes it possible to obtain, in a single operation, a thermoplastic film which is grainy on its two faces, but, in addition, makes it possible to obtain thermoplastic films of a novel kind.

Consequently, the invention also relates to a thermoplastic film, grainy on its two faces, obtainable by the process described above and which is characterized in that it comprises a vinyl chloride polymer with a K value higher than or equal to 75 or a polyolefin of high average molecular mass.

The thermoplastic film preferably consists essentially of a vinyl chloride polymer with a K value higher than or equal to 75 or of a polyolefin of high average molecular mass.

Here and in the continuation of the description, the thermoplastic material preferably does not include any crosslinked vinyl chloride polymer.

The vinyl chloride polymer has a K value higher than or equal to 75 (measured at 25° C. in cyclohexanone and at a concentration of 5 g/l), that is to say that it has a high average molecular mass.

A polyolefin of high average molecular mass is a polyolefin whose melt flow index, or MFI, is not higher than 10.0. In particular the MFI is measured according to ASTM standard D 1238-90b under a 2.16 kg load and is expressed in g/10 min. The temperature of measurement is 190° C. for ethylene polymers (or polymers containing at least 50% by weight of ethylene) and 230° C. for propylene polymers (or polymers containing at least 50% by weight of propylene).

The MFI of the polyolefin is preferably not higher than 5.0 and, still more preferably, is not higher than 3.0.

The use of resins of high average molecular mass, producing films which are not capable of being grained in accordance with the usual processes, offers the advantage that the mechanical strength of the films produced from these resins is improved when compared with those produced from resins with lower average molecular mass. Thus, in order to obtain a product of the same mechanical strength, the thickness of the thermoplastic film may be reduced. Such a reduction in thickness is particularly welcome when these films are used to produce articles in which a high gas permeability is desired, as is often the case with containers for biological fluids.

The invention additionally relates to a thermoplastic film, grainy on its two faces, obtainable by the process described above and comprising a vinyl chloride polymer or a polyolefin, which is characterized in that it comprises a grain of uniform structure on its two faces. Such a grain is, for example, that resulting, on the rolls, from a milling or chemical engraving operation.

The invention also relates to a thermoplastic film, grainy on its two faces, obtainable by the process described above and which is characterized in that it comprises at least one optically clear region on its two faces.

An optically clear region is intended to mean a portion of the surface, of any shape, such that a beam of light passing through the film in this region is transmitted without significant scattering at the interfaces (at least in the visible radiation range). An optically clear region may, however, include, for example, ribs or a relief such that adhesive bonding during sterilization is avoided.

The optically clear region may be obtained, for example, by employing graining rolls in which a corresponding portion of the surface has a mirror-type finish instead of the grain structure to be imprinted.

The invention further relates to a thermoplastic film, grainy on its two faces, obtainable by the process described above and is characterized in that it comprises, at least on one and the same face, a grain of uniform structure with at least one optically clear region.

The thermoplastic films according to the invention preferably comprise a vinyl chloride polymer. Particularly preferably, they consist essentially of a vinyl chloride polymer.

The thermoplastic films in accordance with the invention have characteristics, especially of surface appearance, which make them advantageous for many applications like, for example, the so-called papermaking and small leathercraft field. However, particularly in view of their sterilizability, it is in the medical field that the preferred applications will be carried out.

Consequently, another subject of the invention is the use of at least one thermoplastic film described above for the manufacture of an article for medical use.

Medical is intended to mean any applications which have a relation with the art of preserving or reestablishing human or animal health. This includes especially surgery, pharmacy or dentistry.

A final subject of the invention consists of an article for medical use including at least one thermoplastic film as described above.

The article with which the present invention is concerned may be of any kind. It may be, for example, a pouch, a dressing, a drawsheet, etc.

It is preferably a pouch made up essentially of at least one thermoplastic film as described above. Very good results have been obtained with a pouch made up of two thermoplastic films in accordance with the invention.

The said pouch may be intended to contain, among others, blood, serum, a solution, biological tissue or fluid or a nutrient solution.

The invention is, furthermore, described in greater detail, without any limitation being implied, by the practical examples which follow.

EXAMPLES

Example 1, not in accordance with the invention, is given by way of comparison. Examples 2 to 5 illustrate the invention.

Example 1 (for reference)

A film 350 $\mu$m in thickness was obtained by the usual calendering technique from a composition including (the parts are given by weight):

| | |
|---|---|
| a vinyl chloride polymer with a K value = 71 (resin obtained by a suspension process) | 100 parts |
| plasticizer (mainly diethylhexyl phthalate) | 50 parts |
| heat stabilizer | 2 parts |

This film, at a temperature of 180° C., was grained according to the conventional technique, by passing between an engraved steel roll (face I, engraving of type 1A, nonuniform), heated by internal circulation of water at 50° C., and a rubber roll (face II), cooled by internal circulation of water at 15° C. The surface temperature of this roll, after graining, was measured at approximately 90° C. by an infrared camera.

The roughness of the resulting film was measured on its two faces by means of a Perthen® perthometer according to DIN standard 4768—May 1990, before and after sterilization with steam in an autoclave at 121° C. for 30 minutes.

Twelve points of measurement distributed uniformly on the surface of a sheet originating from the film were employed. The size of the sheet corresponds to the developed area of the rolls. The roughness values of the rolls were also determined. Each point was measured 3 times. The mean values of the measurements are given in Table 1.

TABLE 1

| | Roughness values measured in the case of Example 1 | | | |
|---|---|---|---|---|
| Face | Roll ($\mu$m) | Film before sterilization ($\mu$m) | Film after sterilization ($\mu$m) | Graining yield (%) | Stability to sterilization (%) |
| I | | | | | |
| Ra | 8.4 | 5.1 | 3.9 | 61 | 77 |
| Rmax | — | 31.7 | 23.4 | — | 74 |
| Rz | 43.6 | 24.7 | 19.0 | 57 | 77 |
| II | | | | | |
| Ra | 5.2 | 1.6 | 1.1 | 31 | 69 |
| Rmax | — | 10.9 | 8.1 | — | 74 |
| Rz | 30.0 | 8.3 | 6.3 | 28 | 76 |

Ra = arithmetic mean of the absolute values of the profile separations;
Rz = arithmetic mean of the 5 maximum separation values measured on the 5 adjoining unit sectors of the measurement region;
Rmax = maximum separation on the 5 unit sectors.

Example 2

A film of the same composition as that of Example 1 was obtained by means of an extruder fitted with a flat die. This film, at a temperature of 180° C., was grained by passing between an engraved steel roll (face I, engraving of type 1B, nonuniform, hardness: 570 HV), heated by internal circulation of water at 180° C., and a second engraved steel roll (face II, engraving of type 2, nonuniform, hardness: 570 HV), heated by internal circulation of water at 165° C. The surface temperature of this roll, after graining, was measured at approximately 165° C. with an infrared camera.

The roughness measurements, performed by following the same procedure as that employed in the case of Example 1, are given in Table 2.

TABLE 2

| | Roughness values measured in the case of Example 2 | | | | |
|---|---|---|---|---|---|
| Face | Roll (μm) | Film before sterilization (μm) | Film after sterilization (μm) | Graining yield (%) | Stability to sterilization (%) |
| I | | | | | |
| Ra | 5.8 | 5.3 | 5.3 | 88 | 100 |
| Rmax | — | 31.6 | 31.6 | — | 100 |
| Rz | 31.0 | 26.2 | 25.6 | 85 | 98 |
| II | | | | | |
| Ra | 2.3 | 2.1 | 2.1 | 91 | 100 |
| Rmax | — | 14.0 | 14.3 | — | 102 |
| Rz | 12.8 | 11.6 | 11.8 | 91 | 102 |

Example 3

Example 2 was reproduced, except that the second roll (face II) was replaced with another engraved steel roll (engraving of type 3, nonuniform, hardness: 570 HV).

The roughness measurements were still performed by following the same procedure. The results in the case of face I correspond within 2% to the results in the case of face I of Example 2. The results in the case of face II are mentioned in Table 3.

TABLE 3

| | Roughness values measured in the case of Example 3 | | | | |
|---|---|---|---|---|---|
| Face | Roll (μm) | Film before sterilization (μm) | Film after sterilization (μm) | Graining yield (%) | Stability to sterilization (%) |
| II | | | | | |
| Ra | 6.4 | 5.2 | 5.4 | 81 | 104 |
| Rmax | — | 34.9 | 36.1 | — | 103 |
| Rz | 34.9 | 26.7 | 28.5 | 77 | 107 |

Example 4

Example 2 was reproduced, except that the first roll (face I) was replaced with another engraved steel roll (engraving of type 4, uniformly lozenge-shaped, hardness: 570 HV).

The roughness measurements were still performed by following the same procedure. The results in the case of face II correspond within 2% to the results in the case of face II of Example 2. The results in the case of face I are mentioned in Table 4.

TABLE 4

| | Roughness values measured in the case of Example 4. | | | | |
|---|---|---|---|---|---|
| Face | Roll (μm) | Film before sterilization (μm) | Film after sterilization (μm) | Graining yield (%) | Stability to sterilization (%) |
| I | | | | | |
| Ra | 19 | 20.5 | 21.3 | 108 | 104 |
| Rmax | 103 | 103 | 106 | 100 | 103 |
| Rz | 90 | 93 | 96 | 103 | 103 |

Example 5

A film 350 μm in thickness was obtained according to the same technique as in the case of Examples 2 to 4, from a composition including (the parts are given by weight):

| | |
|---|---|
| a vinyl chloride polymer with a K value = 93 (resin obtained by a suspension process) | 100 parts |
| plasticizer (mainly diethylhexyl phthalate) | 60 parts |
| heat stabilizer | 1 part |

This film, at a temperature of 185° C., was grained by passing between an engraved steel roll (face I, engraving of type 5, nonuniform, hardness: 570 HV), heated by internal circulation of oil at 190° C., and a second engraved steel roll (face II, engraving of type 2, nonuniform, hardness: 570 Hv), heated by internal circulation of oil at 170° C.

The roughness of the resulting film was measured according to the procedure of the preceding examples. The results are given in Table 5.

TABLE 5

| | Roughness values measured in the case of Example 5 | | | | |
|---|---|---|---|---|---|
| Face | Roll (μm) | Film before sterilization (μm) | Film after sterilization (μm) | Graining yield (%) | Stability to sterilization (%) |
| I | | | | | |
| Ra | 2.1 | 1.9 | 2.0 | 90 | 105 |
| Rz | 12.2 | 10.9 | 11.6 | 89 | 106 |
| II | | | | | |
| Ra | 2.3 | 2.1 | 2.1 | 91 | 100 |
| Rz | 12.8 | 11.7 | 12.2 | 91 | 104 |

What is claimed is:

1. A process for the manufacture of a thermoplastic film having a grain of uniform structure on its two faces, comprising a thermoplastic material selected from the group consisting of vinyl chloride polymer with a K value higher than or equal to 93 and a polyolefin of high average molecular mass having a melt flow index not higher than 3.0 g/10 minutes, said process comprising passing said thermoplastic material between two graining rolls, wherein the graining rolls consist essentially of metal having a hardness not lower than 150 HV according to the Vickers test.

2. The process according to claim 1, in which the metal is steel or cast iron.

3. The process according to claim 1, in which each of the rolls is driven in rotation by an independent mechanism.

4. The process according to claim 1, in which at least one of the rolls is maintained at a desired temperature by internal circulation of a heat transfer fluid.

5. A thermoplastic film, having a grain of uniform structure on its two faces, comprising a vinyl chloride polymer with a K value higher than or equal to 93 or a polyolefin of high average molecular mass, having a melt flow index not higher than 3.0 g/10 minutes.

6. The thermoplastic film, grainy on its two faces, as set forth in claim 5 comprising at least one optically clear region on its two faces.

7. The thermoplastic film, grainy on its two faces, as set forth in claim 5 comprising, at least on one and the same face, a grain of uniform structure with at least one optically clear region.

8. The thermoplastic film according to claim 5, comprising a vinyl chloride polymer.

9. A method for the manufacture of an article for medical use comprising the step of forming the thermoplastic film of claim 5 into a pouch.

10. An article for medical use, including at least one thermoplastic film according to claim 5.

11. An article for medical use in the form of a pouch consisting essentially of at least one thermoplastic film according to claim 5.

12. The thermoplastic film, having a grain of uniform structure on its two faces, as set forth in claim 5, prepared by a process comprising passing thermoplastic material between two graining rolls consisting essentially of metal having a hardness not lower than 150 HV according to the Vickers test.

13. The thermoplastic film according to claim 12, including at least one optically clear region on its two faces.

14. The thermoplastic film according to claim 12, comprising, at least on one and the same face, a grain of uniform structure with at least one optically clear region.

15. The thermoplastic film according to claim 5, comprising a polyolefin.

16. The thermoplastic film according to claim 12, comprising a vinyl chloride polymer.

17. The thermoplastic film according to claim 12 comprising a polyolefin.

* * * * *